United States Patent
Altenschulte

(10) Patent No.: US 7,608,937 B1
(45) Date of Patent: Oct. 27, 2009

(54) POWER GENERATION SYSTEM AND METHOD FOR STORING ELECTRICAL ENERGY

(75) Inventor: Markus Altenschulte, Spelle (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/241,951

(22) Filed: Sep. 30, 2008

(51) Int. Cl.
*F03D 9/00* (2006.01)
*H02P 9/04* (2006.01)
*H02P 11/00* (2006.01)

(52) U.S. Cl. .................... 290/44; 322/24; 322/28
(58) Field of Classification Search ................ 290/44, 290/55; 322/24, 28; 416/132 B; 60/398; 363/15, 95, 68, 108, 109
See application file for complete search history.

(56) References Cited

U.S. PATENT DOCUMENTS

| | | | |
|---|---|---|---|
| 4,695,776 A * | 9/1987 | Dishner et al. | 318/14 |
| 6,487,096 B1 * | 11/2002 | Gilbreth et al. | 363/35 |
| 6,819,007 B2 * | 11/2004 | Fukaya | 290/40 C |
| 6,989,655 B2 * | 1/2006 | Eguchi et al. | 322/23 |
| 7,239,035 B2 * | 7/2007 | Garces et al. | 290/43 |
| 2007/0029799 A1 * | 2/2007 | Shimizu et al. | 290/1 A |
| 2008/0157593 A1 * | 7/2008 | Bax et al. | 307/10.1 |
| 2009/0066089 A1 * | 3/2009 | Arinaga et al. | 290/55 |

FOREIGN PATENT DOCUMENTS

JP 2003324848 A * 11/2003

* cited by examiner

*Primary Examiner*—Julio C. Gonzalez
(74) *Attorney, Agent, or Firm*—Cantor Colburn LLP

(57) ABSTRACT

A power generation system and a method for storing electrical energy are provided. The method includes generating a first AC voltage from a wind turbine generator and converting the first AC voltage to a first DC voltage, utilizing a rectifier. The method further includes routing the first DC voltage through a DC voltage bus to an inverter of the power converter, and converting the first DC voltage to a second AC voltage utilizing the inverter and outputting the second AC voltage to an electrical grid in response to a first control signal from a power converter controller. The method further includes receiving the first DC voltage from the DC voltage bus at a DC-DC converter operably coupled to the DC voltage bus, and storing electrical energy from the first DC voltage in a battery storage unit utilizing the DC-DC converter in response to a second control signal.

9 Claims, 3 Drawing Sheets

US 7,608,937 B1

POWER GENERATION SYSTEM AND METHOD FOR STORING ELECTRICAL ENERGY

BACKGROUND OF THE INVENTION

Wind farms have been utilized to generate electrical power. The wind farms typically have a plurality of wind turbines each generating electrical power. However, when the wind farms begin generating excess electrical power that is not needed by an electrical grid, a control system reduces an amount of electrical power generated by the wind turbines. Accordingly, a total amount of electrical power that the wind turbines are capable of generating is not utilized.

Accordingly, the inventor herein has recognized a need for an improved power generation system that minimizes and/or eliminates the above mentioned deficiency.

BRIEF DESCRIPTION OF THE INVENTION

A power generation system in accordance with an exemplary embodiment is provided. The power generation system includes a power converter having a housing, a rectifier, a DC voltage bus, an inverter, and a power converter controller. The rectifier, the DC voltage bus, the inverter and the power converter controller are disposed in the housing. The DC voltage bus is electrically coupled to both the rectifier and the inverter. The controller operably communicates with the inverter. The rectifier is configured to receive a first AC voltage and to convert the first AC voltage to a first DC voltage. The DC voltage bus is configured to route the first DC voltage to the inverter. The inverter is configured to convert the first DC voltage to a second AC voltage and to output the second AC voltage to an electrical grid in response to a first control signal from the power converter controller. The power generation system further includes a DC-DC converter operably coupled to the DC voltage bus. The DC-DC converter is configured to receive the first DC voltage from the DC voltage bus and to store electrical energy from the first DC voltage in a battery storage unit in response to a second control signal. The DC-DC converter is further configured to output a second DC voltage that is routed through the DC voltage bus to the inverter in response to a third control signal. The inverter of the power converter is further configured to convert the second DC voltage to a third AC voltage and to output the third AC voltage on the electrical grid in response to a fourth control signal from the power converter controller.

A method for storing electrical energy in accordance with another exemplary embodiment is provided. The method includes generating a first AC voltage from a wind turbine generator. The method further includes converting the first AC voltage to a first DC voltage, utilizing a rectifier of a power converter that is electrically coupled to the wind turbine generator. The method further includes routing the first DC voltage through a DC voltage bus to an inverter of the power converter. The method further includes converting the first DC voltage to a second AC voltage utilizing the inverter and outputting the second AC voltage to an electrical grid in response to a first control signal from a power converter controller. The method further includes receiving the first DC voltage from the DC voltage bus at a DC-DC converter operably coupled to the DC voltage bus. The method further includes storing electrical energy from the first DC voltage in a battery storage unit utilizing the DC-DC converter in response to a second control signal.

DETAILED DESCRIPTION OF THE INVENTION

Figure 1:
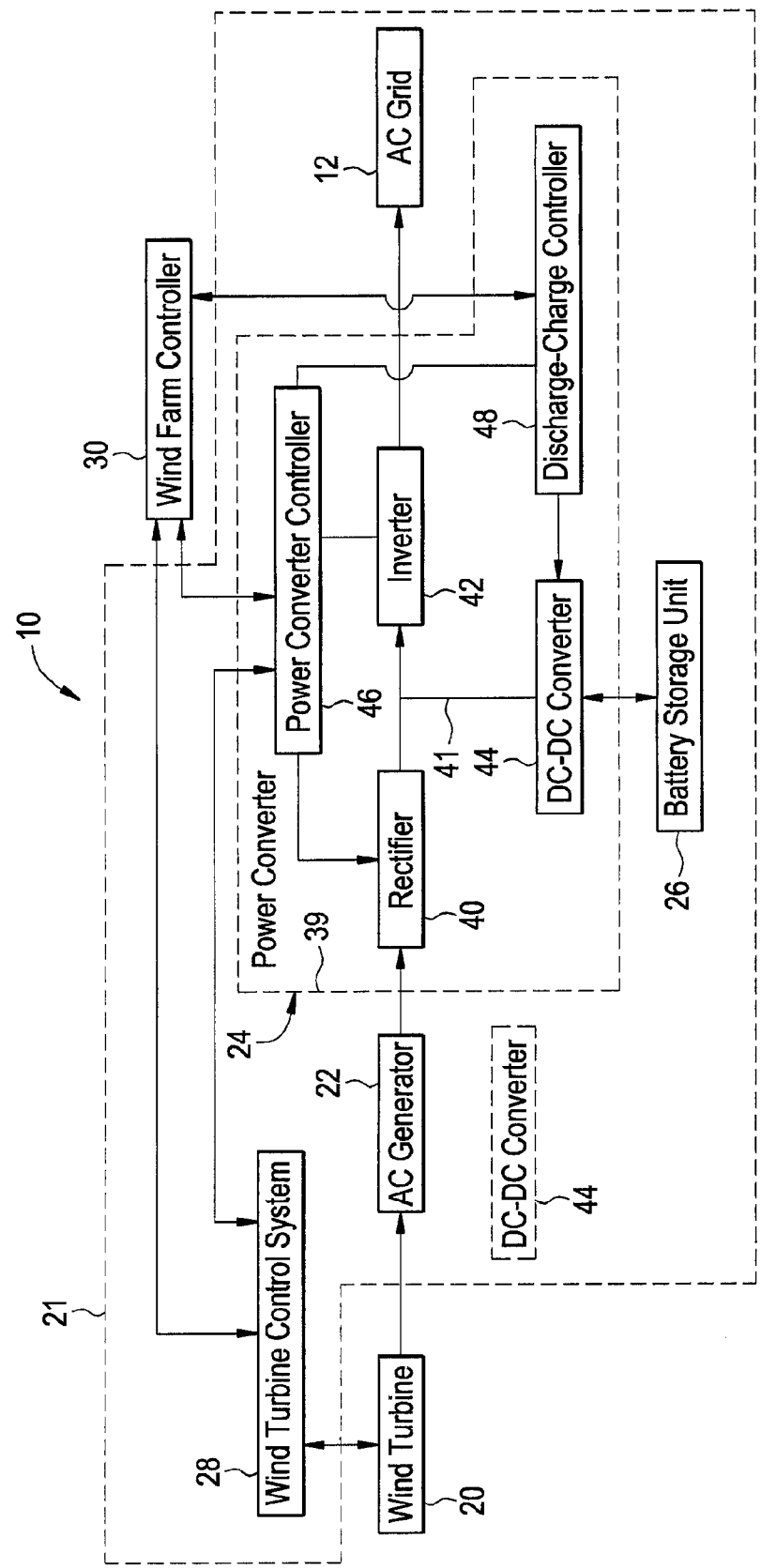
FIG. 1 is a schematic of a wind farm power generation system in accordance with an exemplary embodiment.

Referring to FIG. 1, a wind farm power generation system 10 for delivering electrical power to the AC electrical grid 12 will now be explained. The wind farm power generation system 10 includes a wind turbine 20, a wind turbine housing 21, an AC generator 22, a power converter 24, a battery storage unit 26, a wind turbine control system 28, and a wind farm controller 30.

The wind turbine 20 is configured to rotate in response to wind contacting the wind turbine 20 to drive the AC generator 22 such that the AC generator 22 outputs an AC voltage. The wind turbine 20 is operably coupled to the wind turbine controller 28 which can control operation of the wind turbine 20.

The wind turbine housing 21 is configured to enclose the AC generator 22, the power converter 24, the battery storage unit 26, and the wind turbine controller 28 therein. The wind turbine 20 is rotatably coupled to the wind turbine housing 21.

The power converter 24 is configured to receive the AC voltage from the AC generator 22 and to supply an AC voltage to the AC electrical grid 12. The power converter 24 is further configured to supply a DC voltage to the battery storage unit 26 for storing excess electrical energy generated by the AC generator 22. The power converter 24 includes housing 39, a rectifier 40, an inverter 42, a DC-DC converter 44, a power converter controller 46, and a discharge-charge controller 48. In one exemplary embodiment, the housing 39 is configured to hold the rectifier 40, the inverter 42, the DC-DC converter 44, the controller 46, the discharge-charge controller 48 therein. In another exemplary embodiment, the DC-DC converter 44 is disposed outside of the housing 39 and is operably coupled between the DC voltage bus 41 and the battery storage unit 26.

The rectifier 40 is configured to receive the AC voltage from the AC generator 22 and to rectify the AC voltage to obtain a DC voltage. The rectifier 40 outputs the DC voltage on a DC voltage bus 41. The DC voltage bus 41 routes the DC voltage to both the inverter 42 and the DC-DC converter 44.

The inverter 42 is configured to receive the DC voltage from the DC voltage bus 41 and to convert the DC voltage to an AC voltage that is output from the inverter 42 to the AC electrical grid 12. In particular, the inverter 42 outputs the AC voltage to the AC electrical grid 12 in response to the inverter 42 receiving a control signal from the power converter controller 46. Further, the power converter controller 46 generates the control signal that is received by the inverter 42, in response to the power converter controller 46 receiving a control signal from the wind farm controller 30.

The DC-DC converter 44 is configured to receive the DC voltage from the DC voltage bus 41. The DC-DC converter 44 adjusts the voltage level of the DC voltage and outputs a DC voltage to the battery storage unit 26 in response to a control signal from the discharge-charge controller 48. The battery storage unit 26 receives the DC voltage output from the DC-DC converter 44 and stores electrical energy therein. The DC-DC converter 44 is further configured to output a DC voltage on the DC voltage bus 41 utilizing electrical energy from the battery storage unit 26 in response to another control signal from the discharge-charge controller 48.

The power converter controller 46 is configured to control operation of the power converter 24. In particular, the controller 46 generates a control signal to induce the inverter 42 to output an AC voltage on the AC electrical grid 12, in response to a control signal form the wind farm controller 30. Further, the controller 46 generates another control signal to induce the discharge-charge controller 48 to instruct the DC-DC converter 44 to store electrical energy in the battery storage unit 26. Further, the controller 46 generates another control signal to induce the discharge-charge controller 48 to instruct the DC-DC converter 44 to output a DC voltage on the DC voltage bus 41 utilizing electrical energy stored in the battery storage unit 26. As shown, the power converter controller 46 is operably coupled to the inverter 42, the discharge-charge controller 48, the wind farm controller 30, and the wind turbine control system 28.

The discharge-charge controller 48 is configured to control operation of the DC-DC converter 44 such that the DC-DC converter 44 either outputs a DC voltage to the battery storage unit 26 to store electrical energy therein or outputs a DC voltage on the DC voltage bus 41.

The battery storage unit 26 is configured to store electrical energy therein in response to receiving a DC voltage from the DC-DC converter 44. The battery storage unit 26 comprises one or more batteries electrically coupled together. The battery storage unit 26 can also output a DC voltage to the DC-DC converter 44.

The wind turbine control system 28 is configured to control operation of the wind turbine 20. In particular, the wind turbine control system 28 can control an operational position of the wind turbine 20, and a maximum rotational speed of the wind turbine in response to a control signal received from the wind farm controller 30.

The wind farm controller 30 is configured to control an amount of outputted electrical power from the power converter 24 to the AC electrical grid 12. The wind farm controller 30 generates control signals that are received by the wind turbine control system 28, the power converter controller 46 and the discharge-charge controller 48.

A general overview of the operation of the wind farm power generation system 10 will now be provided. The wind farm controller 30 monitors and controls an actual amount of outputted electrical power from the system 10. Typically, the wind farm controller 30 will instruct the power converter controller 46 to output all generated electrical power to the AC electrical grid 12. However, if a windspeed is high enough to allow the AC generator 22 to produce more electrical power than needed, the wind farm controller 30 can instruct the discharge-charge controller 48 to store at least a portion of the generated electrical energy from the AC generator 22 in the battery storage unit 26. It should be noted that for storage optimization, the storage capacity of each battery storage unit 26 could be selected based on local wind conditions. If a windspeed is too low for a wind turbine AC generator 22 to output a desired amount of electrical power, the wind farm controller 30 can instruct the power converter 24 and the discharge-charge controller 48 to extract electrical energy from the local battery storage unit 26 and to output electrical power on the AC electrical grid 12.

Figure 2:
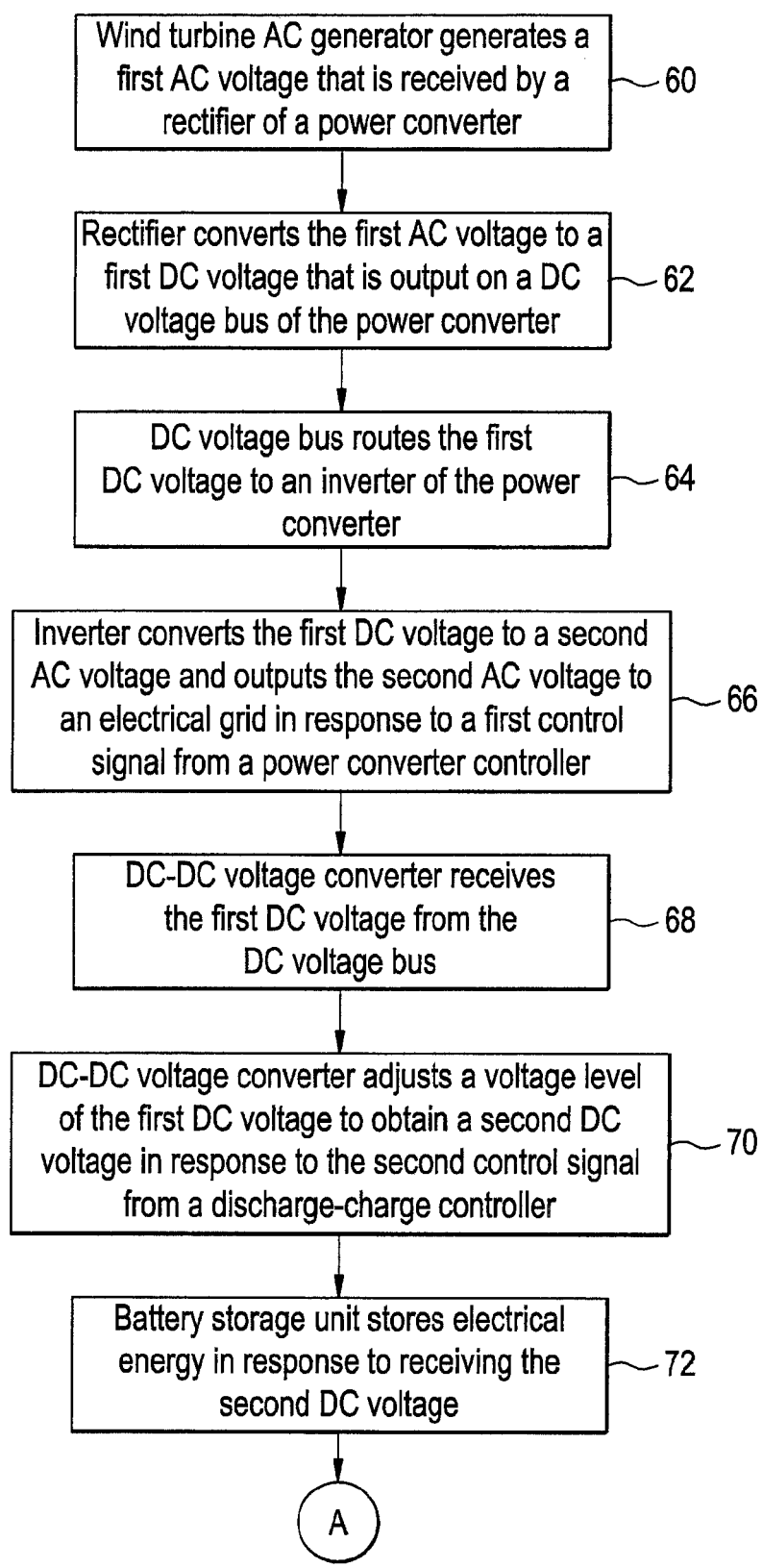
FIGS. 2 and 3 are flowcharts of a method for storing electrical energy in accordance with another exemplary embodiment.
Figure 3:
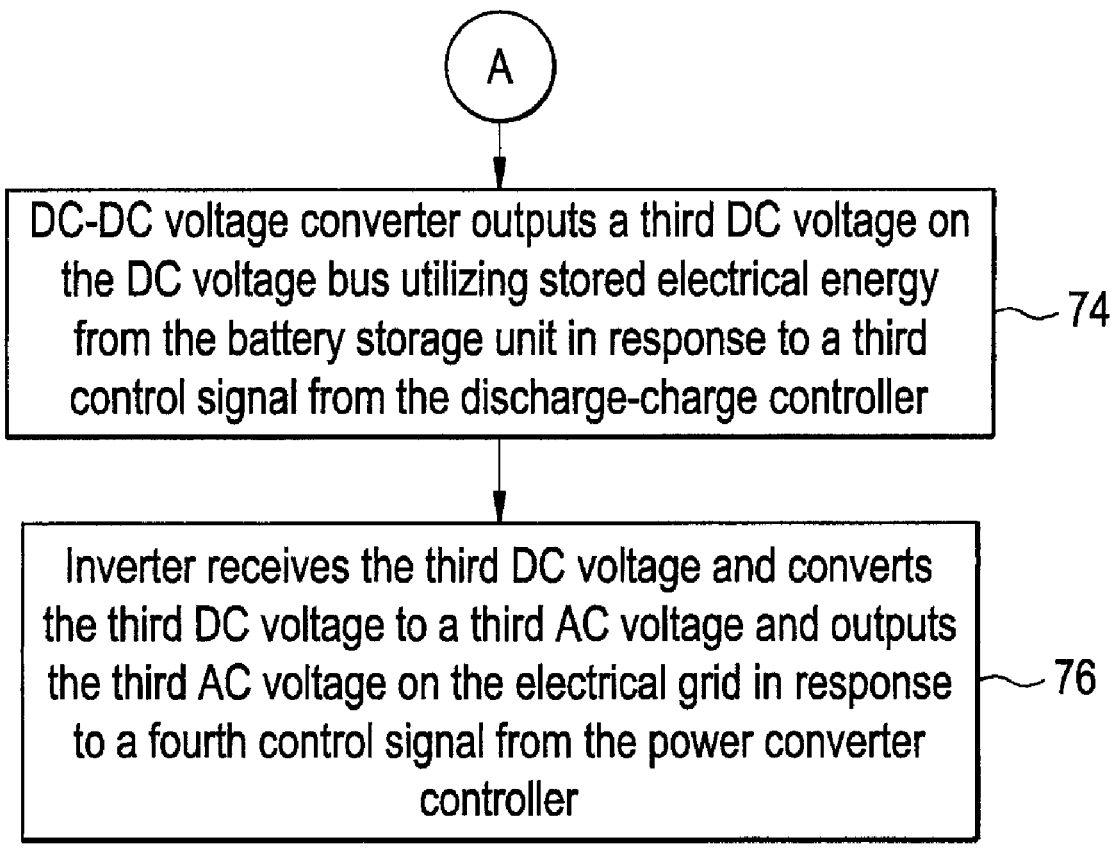

Referring to FIGS. 2 and 3, a flowchart of a method for storing electrical energy utilizing the wind farm power generation system 10 will now be explained.

At step 60, the wind turbine AC generator 22 generates a first AC voltage that is received by the rectifier 40 of the power converter 24.

At step 62, the rectifier 40 converts the first AC voltage to a first DC voltage that is output on the DC voltage bus 41 of the power converter 24.

At step 64, the DC voltage bus 41 routes the first DC voltage to the inverter 42 of the power converter 24.

At step 66, the inverter 42 converts the first DC voltage to a second AC voltage and outputs the second AC voltage to an electrical grid 12 in response to a first control signal from the power converter controller 46.

At step 68, the DC-DC voltage converter 44 receives the first DC voltage from the DC voltage bus 41.

At step 70, the DC-DC voltage converter 44 adjusts a voltage level of the first DC voltage to obtain a second DC voltage in response to the second control signal from the discharge-charge controller 48.

At step 72, the battery storage unit 26 stores electrical energy in response to receiving the second DC voltage.

At step 74, the DC-DC voltage converter 44 outputs a third DC voltage on the DC voltage bus 41 utilizing stored electrical energy from the battery storage unit 26 in response to a third control signal from the discharge-charge controller 48.

At step 76, the inverter 42 receives the third DC voltage and converts the third DC voltage to a third AC voltage and outputs the third AC voltage on the electrical grid 12 in response to a fourth control signal from the power converter controller 24.

The power generation system and the method for storing electrical energy provide a substantial advantage over other systems and methods. In particular, the power generation system and the method provide a technical effect of storing electrical energy utilizing a battery storage unit operably coupled to a power converter within a wind turbine housing.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

The invention claimed is:

1. A power generation system, comprising:
    a power converter having a housing, a rectifier, a DC voltage bus, an inverter, and a power converter controller, the rectifier, the DC voltage bus, the inverter and the power converter controller being disposed in the housing, the DC voltage bus being electrically coupled to both the rectifier and the inverter, the controller operably communicating with the inverter, the rectifier configured to receive a first AC voltage and to convert the first AC voltage to a first DC voltage, the DC voltage bus configured to route the first DC voltage to the inverter, the inverter configured to convert the first DC voltage to a second AC voltage and to output the second AC voltage to an electrical grid in response to a first control signal from the power converter controller;
    a DC-DC converter operably coupled to the DC voltage bus, the DC-DC converter configured to receive the first DC voltage from the DC voltage bus and to store electrical energy from the first DC voltage in a battery storage unit in response to a second control signal, the DC-DC converter further configured to output a second DC voltage that is routed through the DC voltage bus to the inverter in response to a third control signal; and the inverter of the power converter further configured to convert the second DC voltage to a third AC voltage and to output the third AC voltage on the electrical grid in response to a fourth control signal from the power converter controller.

2. The power generation system of claim 1, further comprising a discharge-charge controller operably coupled to the DC-DC converter.

3. The power generation system of claim 2, wherein the DC-DC voltage converter is configured to adjust a voltage level of the first DC voltage to obtain a third DC voltage in response to the second control signal from the discharge-charge controller.

4. The power generation system of claim 3, wherein the battery storage unit is configured to store electrical energy in response to receiving the third DC voltage from the DC-DC converter.

5. The power generation system of claim 2, wherein the DC-DC voltage converter is further configured to output the second DC voltage to the DC voltage bus utilizing the stored electrical energy from the battery storage unit in response to the third control signal from the discharge-charge controller.

6. The power generation system of claim 1, wherein the DC-DC converter is disposed in the housing of the power converter.

7. The power generation system of claim 1, wherein the DC-DC converter is disposed outside of the housing of the power converter.

8. The power generation system of claim 1, further comprising a wind turbine generator configured to generate the first AC voltage, the wind turbine generator being electrically coupled to the rectifier of the power converter.

9. A method for storing electrical energy, comprising:

generating a first AC voltage from a wind turbine generator;

converting the first AC voltage to a first DC voltage, utilizing a rectifier of a power converter that is electrically coupled to the wind turbine generator;

routing the first DC voltage through a DC voltage bus to an inverter of the power converter;

converting the first DC voltage to a second AC voltage utilizing the inverter and outputting the second AC voltage to an electrical grid in response to a first control signal from a power converter controller;

receiving the first DC voltage from the DC voltage bus at a DC-DC converter operably coupled to the DC voltage bus;

storing electrical energy from the first DC voltage in a battery storage unit utilizing the DC-DC converter in response to a second control signal;

outputting a second DC voltage from the DC-DC converter that is routed through the DC voltage bus to the inverter in response to a third control signal; and converting the second DC voltage to a third AC voltage utilizing the inverter and outputting the third AC voltage on the electrical grid in response to a fourth control signal from the power converter controller.

* * * * *